United States Patent [19]

Leclerco

[11] Patent Number: 4,675,151
[45] Date of Patent: Jun. 23, 1987

[54] NUCLEAR FUEL ASSEMBLY LOCK DOWN DEVICE

[75] Inventor: Joseph Leclerco, Saint Didier au Mont d'Or, France

[73] Assignee: Framatome et Cogema "Fragema", Courbevoie, France

[21] Appl. No.: 704,222

[22] Filed: Feb. 22, 1985

[30] Foreign Application Priority Data

Feb. 22, 1984 [FR] France ................ 84 02682

[51] Int. Cl.⁴ .............................................. G21C 3/30
[52] U.S. Cl. ................................................. 376/364
[58] Field of Search ....................... 376/178, 364, 362

[56] References Cited

U.S. PATENT DOCUMENTS

| | | | |
|---|---|---|---|
| 3,274,071 | 9/1966 | Janusz et al. | 376/364 |
| 4,134,790 | 1/1979 | Berilacqua et al. | 376/364 |
| 4,194,948 | 3/1980 | Ledin | 376/364 |
| 4,268,357 | 5/1981 | Formanek et al. | 376/364 |
| 4,298,434 | 11/1981 | Anthony et al. | 376/364 |
| 4,309,251 | 1/1982 | Anthony et al. | 376/364 |

FOREIGN PATENT DOCUMENTS 2023786  6/1974  France .

Primary Examiner—Deborah L. Kyle
Assistant Examiner—Richard L. Klein
Attorney, Agent, or Firm—Pollock, Vande Sande & Priddy

[57] ABSTRACT

A nuclear reactor has a stationary horizontal core plate and a plurality of upright nuclear fuel assemblies all having the same cross-section and located side by side in a regular polygonal network. Each fuel assembly either has two locations for elongated plug elements or is adjacent a fuel assembly having such locations. A device for holding down the fuel assemblies comprises a plurality of locking sets each having at least one deformable locking member and a rigid member one of which is carried by a fuel assembly and the other by the core plate. The deformable locking member is so located with respect to a location and with the associated rigid member that insertion of an elongated element into the location forces the deformable locking member into positive engagement with the associated rigid member.

7 Claims, 9 Drawing Figures

NUCLEAR FUEL ASSEMBLY LOCK DOWN DEVICE

BACKGROUND AND SUMMARY OF THE INVENTION

The invention relates to a device, often called anti-blow up device for holding the nuclear fuel assemblies in position with respect to a fixed horizontal core plate of a reactor, the assemblies all having the same cross section and being assembled together side by side in a regular polygonal network (generally square or hexagonal). It finds a particularly important application in nuclear reactors, such as light water moderated and cooled reactors, whose assemblies are formed of fissile material elements supported and held in position in the assembly by a skeleton comprising two end pieces having holes for coolant passage and connected together by tubes.

It is now general practice to control the reactor by using a cluster of elements containing a neutron absorbing material supported by a common piece which is often called spider for moving them as a whole. The distribution of the elements in the cluster associated with an assembly which is provided therewith is such that the anti-reactivity of the elements is exerted on the adjacent assemblies, so that only a fraction of the assemblies need be equipped with such clusters. Other assemblies will be provided for receiving shut down, start up, consumable poison clusters or clusters of fuel elements forming plugs for closing the guide tubes so that these latter do not form a bypass path for the coolant of the reactor.

In all cases, the fuel assemblies rest on a core support plate which has openings for the passage of the coolant fluid and generally centering pins cooperating with the lower end plate of the assemblies for positioning these latter accurately. Above the assemblies is placed an upper plate which defines the core and also has openings for the passage of the coolant fluid.

The upward flow of the coolant fluid in the core exerts on the assemblies a force which tends to raise them if it exceeds their weight. So that this hydraulic thrust does not cause such raising, also called "blow up", of the assemblies, which would risk damaging them, anti-blow up devices are provided for holding the assembly in contact with the supporting core plate. Very different solutions have already been proposed. In particular, a latching system has been proposed for holding a central assembly in position which, through a connecting rod assembly, retains the adjacent assemblies (French No. 2 02 3 786). This device is very complex, involves a long handling operation during assembly changes while the reactor is shut down, introduces twisting stresses in the skeleton of the assembly because the control takes place under water, remotely and by means of a central rod extending over the whole height of the assembly. Springs have also been used supported by the top end piece of the assembly, on which the upper core plate applies a compression force holding the assemblies on the lower core plate (French Nos. 1 536 257, 2 236 010). Although these spring devices generally work satisfactorily, they have on the other hand the disadvantage of being difficult to manufacture, of deteriorating under radiation and, because of the space they require, reducing the passage section for the coolant fluid.

An anti-blow up device has also been proposed (U.S. Pat. No. 4,134,790) comprising leaf springs fast with the lower end piece and having a catch which the resilience of the spring engages in a groove formed in the alignment pins with which the upper face of the core plate is provided. This is an elastic locking whose efficiency depends on the characteristics of the leaf spring being maintained. Now, these characteristics modify under irradiation during operation of the core and the retention becomes uncertain. In addition, the leaf springs become brittle under irradiation.

It is an object of the invention to provide an improved assembly holding device. It is a more specific object to provide a device which positively locks the assemblies on a core plate, which will generally (but not necessarily) be the lower plate, using only simple and rugged means.

To this end, the invention provides a device for use in a reactor in which the assemblies have the same cross-section and are assembled together side by side in up-right position according to a regular polygonal array and in which each assembly is either equipped with at least two locations for receiving elongated elements insertable vertically into said locations and immobilized during operation of the reactor, or adjacent an assembly thus equipped. The device then comprises sets each formed by at least one deformable locking member and a rigid member latchable by deformation of the resilient direction of the elements, the members being interlocked one with an assembly, the other with a core plate of the reactor and being placed with respect to said locations so that insertion of the associated elongated element positively locks the deformable member on the rigid member. The deformable member may typically be a resilient strip or blade spring securely connected to one of the end pieces of the assembly (generally the lower end piece) at one end thereof. The locations are frequently defined by guide tubes provided in the framework of the assembly.

The blade spring securely connected with the piece is formed with guide means having a passage through which the element can pass and an end cam which upon insertion of the element is forced into a locking position in which it projects into a recess in the rigid member.

Several blade springs belonging to adjacent assemblies may be simultaneously forced into their respective locking positions by insertion of the same element, either when they are placed on each side of the element, or when they are disposed in cascade arrangement.

The invention will be better understood from reading the following description of particular embodiments thereof, given by way of examples. The description refers to the accompanying drawings.

SHORT DESCRIPTION OF THE DRAWINGS

Figure 1:
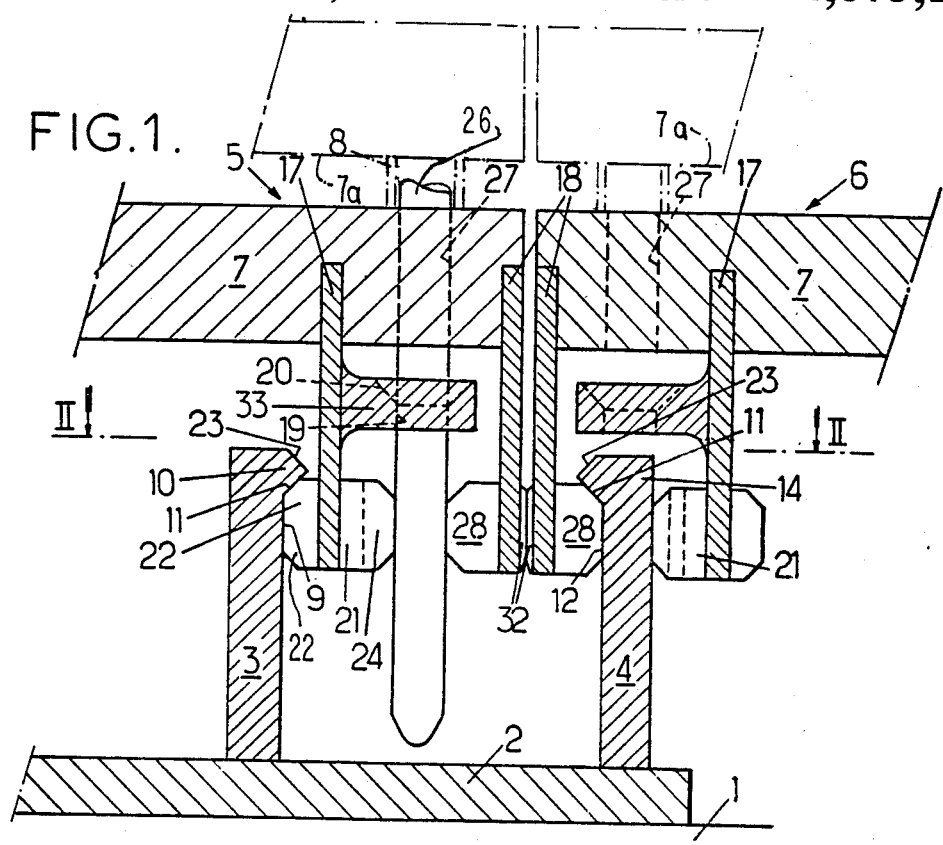
FIG. 1 is a simplified sectional view showing a fraction of the lower end of two adjacent fuel assemblies, equipped with a holding device in accordance with a first embodiment of the invention.
Figure 6:
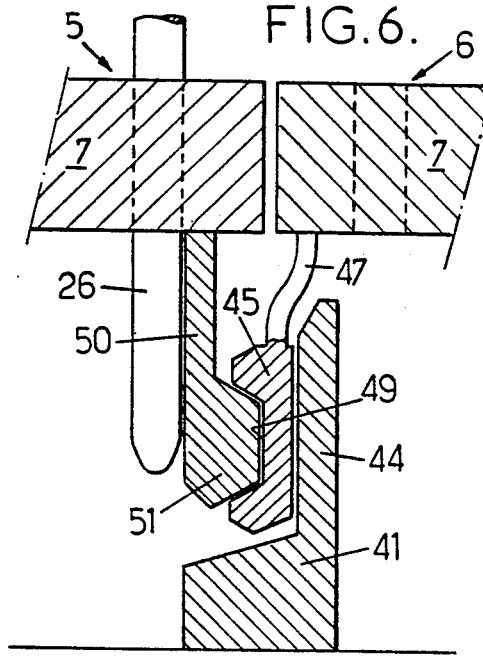
Figure 7:
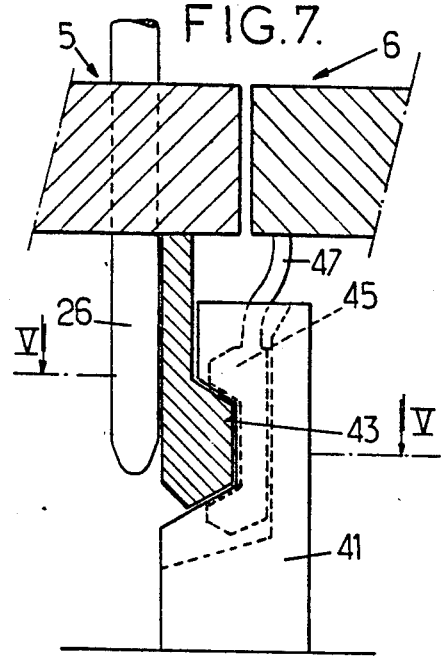
Figure 2:
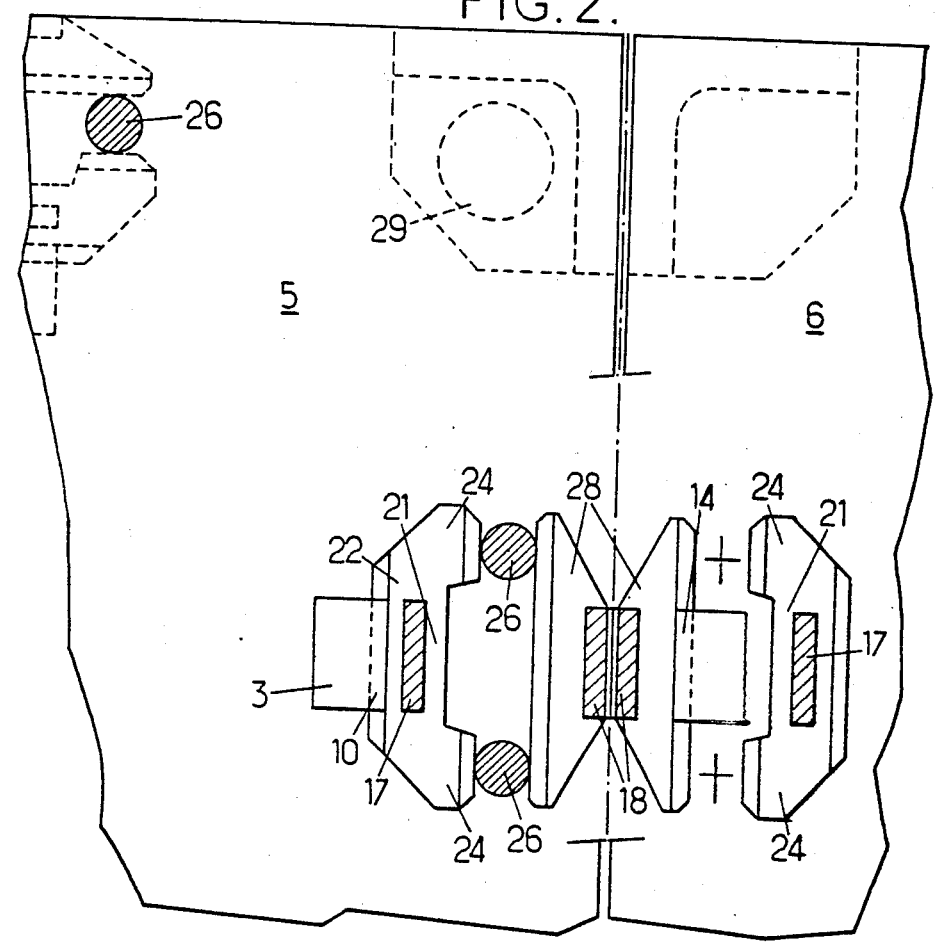
FIG. 2 is a sectional view along line II—II of FIG. 1.
Figure 5:
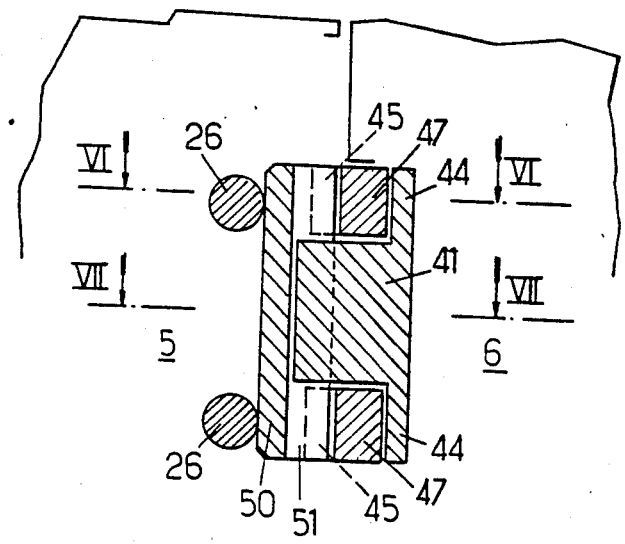
Figure 4:
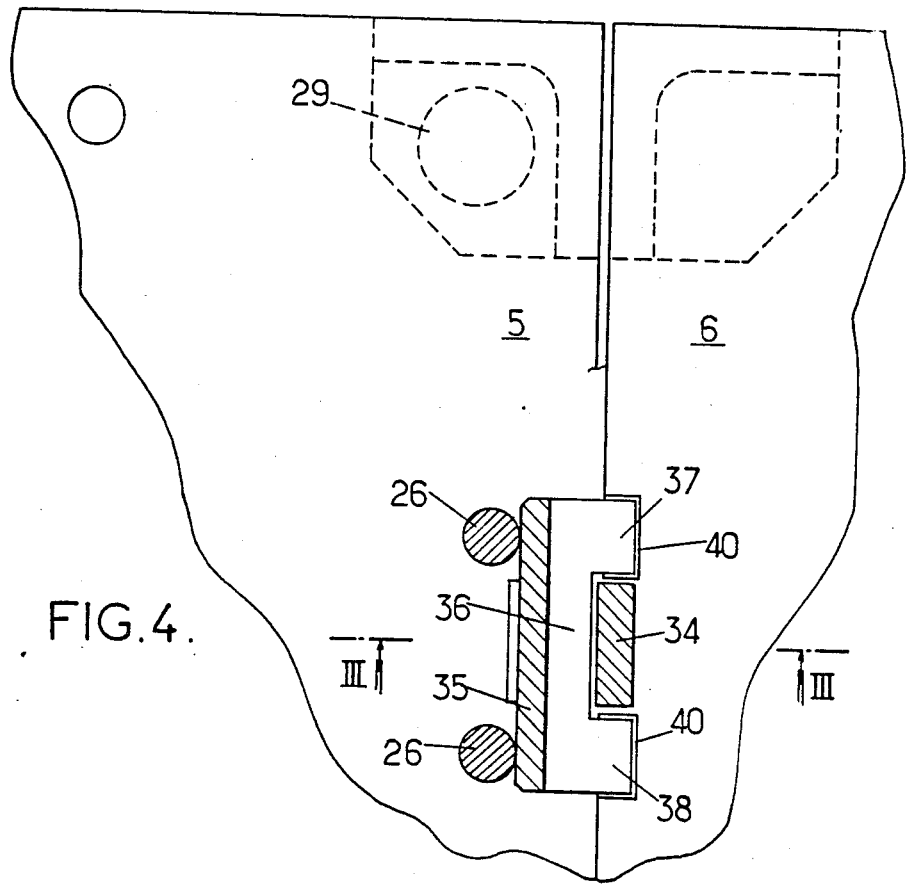
Figure 3:
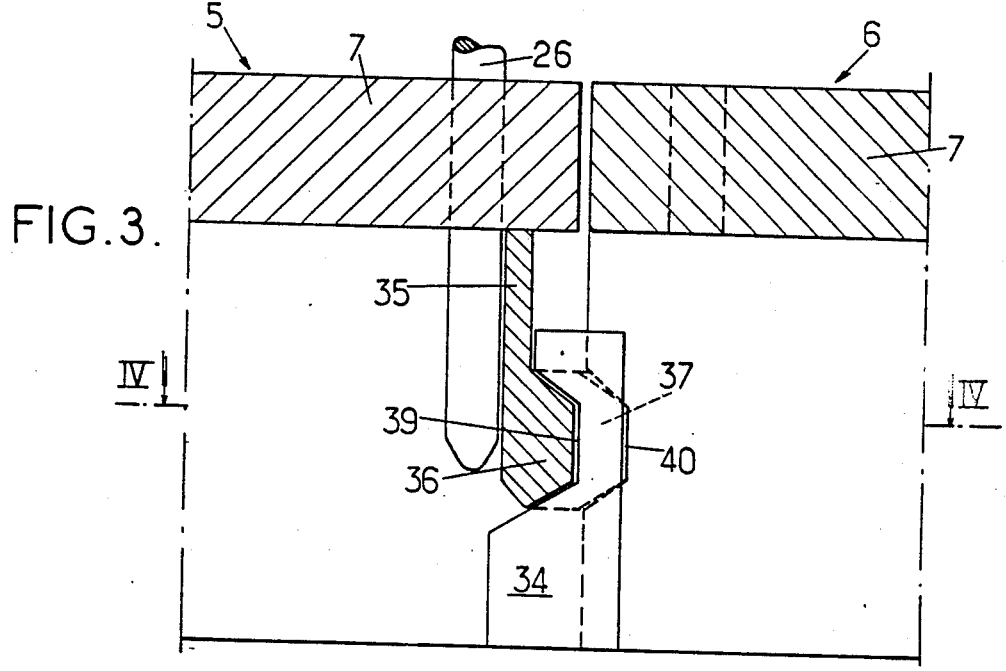
Figure 8:
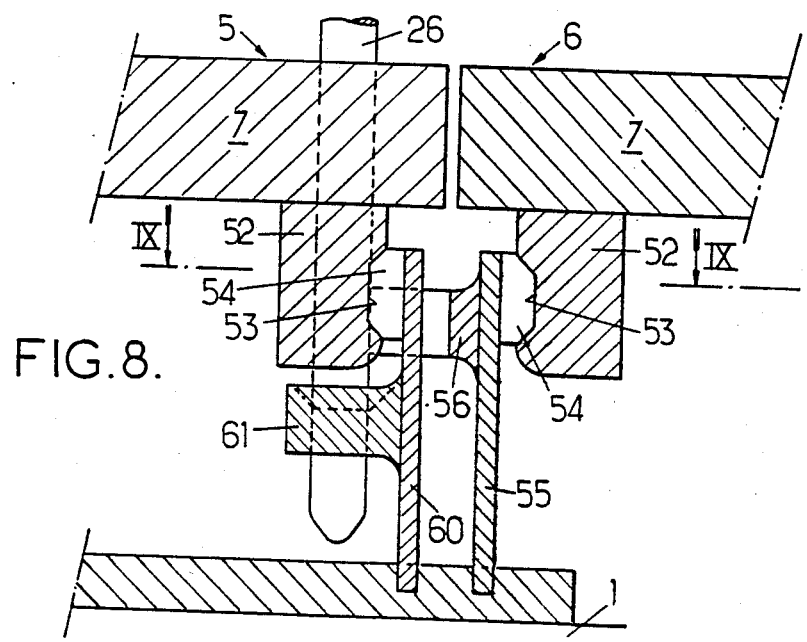
Figure 9:
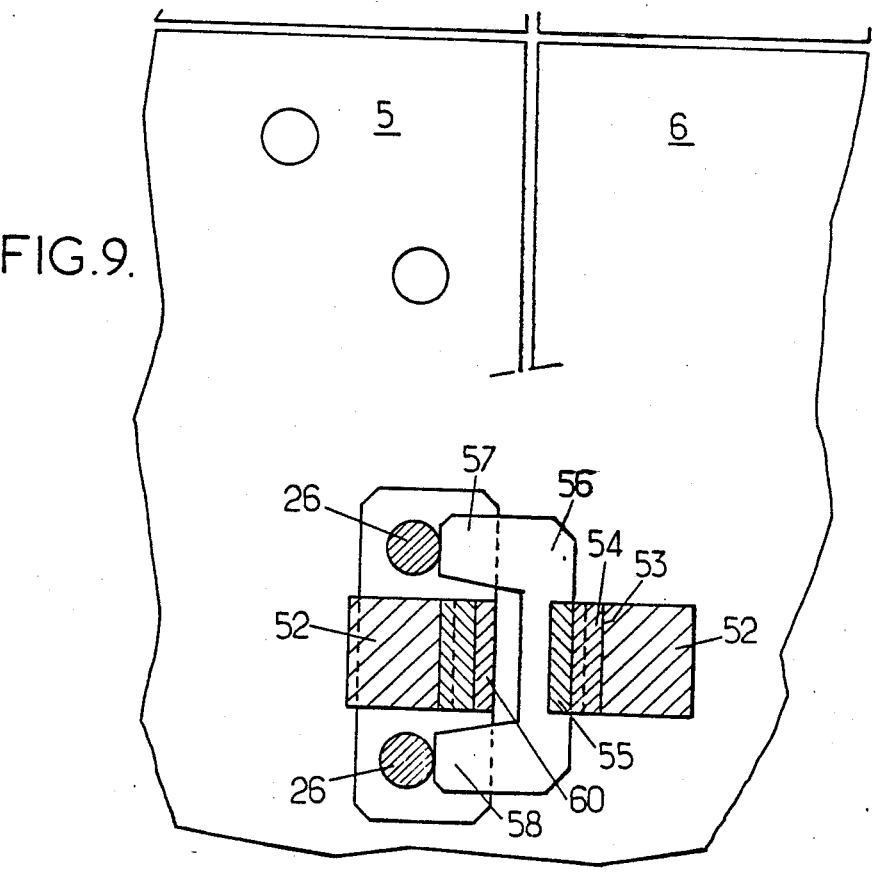

FIGS. 3 and 4, similar to FIGS. 1 and 2 (FIG. 3 being in section along line III—III of FIG. 4) show another embodiment of the invention;

FIG. 5 is a horizontal sectional view along line V—V of FIGS. 6 and 7 showing yet another embodiment of the invention;

FIGS. 6 and 7 are sections through lines VI—VI and VII—VII of FIG. 5;

FIGS. 8 and 9, similar to FIGS. 1 and 2, show a further embodiment of the invention, FIG. 9 being in section through line IX—IX of FIG. 1.

DETAILED DESCRIPTION OF PREFERRED EMBODIMENTS

Referring to FIGS. 1 and 2, a holding device suitable for use in a reactor moderated and cooled by pressurized water comprises a core support plate or lower plate 1 on which square cross section assemblies are to be held in place, and above which is placed, during operation of the reactor, an upper core plate (not shown in the Figures).

FIGS. 1 and 2 show a fraction of the lower end pieces 7 of two adjacent assemblies. These end pieces comprise, in a way known per se and not shown, a steel frame whose side wall ends rest on the core plate 1. Each piece 7 is connected by guide tubes 8, only one of which is shown in FIG. 1, to an upper end piece 7a. Grids spaced apart along the guide tubes define cells disposed in a regular network and holding the fuel elements of the assembly in position. It will also be assumed in what follows that one assembly out of two (assembly 5 in FIGS. 1 and 2) is provided for receiving an element forming a plug for closing the guide tubes, whereas the adjacent assembly 6 comprises guide tubes in which control elements may move, such as neutron absorbing elements belonging to a control cluster.

The lower core plate 1 is provided with sole pieces 2 to which are fixed, for example by welding, alignment pins 3 and 4 which will be generally made from stainless steel, pins 3 being intended to cooperate with assembly 5 and pin 4 with assembly 6. In other words, pins 4 correspond to the location of an assembly equipped with a cluster of elements forming plugs whereas pins 4 correspond to the location of an assembly equipped with a movable element cluster. The pins could of course be directly fixed to the lower core plate 1.

Pins 3 and 4 form the rigid members of the holding device and each comprises at least one locking recess. Pin 3 comprises a single recess formed by an indentation in the form of an axially extending slot, occupying part of the height of pin 3 so as to leave a terminal end piece 10. The transition between indentation 9 on the one hand and end piece 10 on the other is formed by a chamfer 11 for facilitating locking as will be seen further on. Similarly, pin 4 comprises an axially directed indentation 12, similar in form to that of indentation 9 and also having a chamfer 11.

Each of the end plates 7 comprises two metal blade springs, made for example from an alloy known under the name "INCONEL", the blade springs having the same disposition for all the assemblies so that each assembly may be loaded in any location and with any orientation in the core of the reactor. The connection between the roots of springs 17 and 18 and the end pieces 7 does not authorize mutual rotation. It may be provided by force fitting and welding of the end part of the blade.

The blade spring 17, offset with respect to the periphery of the end piece 7, is fast with a guide 33 formed with bores 19 having an inlet chamfer 20, aligned with two guide tubes 8 when the blade spring is free. The lower end of blade spring 17, that is to say opposite its root, is fixed to a fork-shaped piece 21, having two cam portions 24 cooperating with the elongated elements 26 insertable in the guide tube 8 and also having a catch 22 cooperating with indentation 9. Catch 22 and piece 21 have chamfered edges. Those of catch 22 cooperate with chamfer 11 for engagement and locking on end piece 10 of pin 3 and with chamfer 23 for facilitating the guiding and bending of blade 17 during positioning of the assembly. These chamfers serve a similar function on removal. The chamfered edges of cam portions 24 of piece 21 facilitate engagement with the elongated elements 26, in the case of an assembly 5 whose elements constitute plugs. The elements have a tapered end for easier introduction into a bore 27 of the end piece, then into piece 33 and against piece 21.

In an assembly 6 without elongated elements 26, the pin 4 may be placed in alignment with bores 27. The chamfers 11 and 12 formed on the end piece 14 have the same function as chamfers 11 and 23 of pin 3, as will be seen further on.

The second blade spring 18 is secured, like spring 17, to piece 7 but in the edge portion thereof. Blade spring 18 has at its end a solid piece 28 also forming a locking catch, as shown in FIGS. 1 and 2. In FIG. 2 it can be seen that the anti-blow up devices which have just been described are situated in the middle of the faces of the assembly. They are completed by pins 29 also carried by the solepieces 2 for engagement in appropriate holes provided in the corners of pieces 7. These pins may also be provided with an anti-blow up device.

Each of the solid pieces 28 comprises chamfers comparable to those of pieces 21. The chamfers of pieces 28 supported by an assembly 6 cooperate with the chamfer 11 of a pin 4 and chamfer 23 which facilitate bending of the blade spring during insertion into assembly 6. In the case of an assembly 5, the upper chamfer of piece 28 cooperates with the associated elongated elongated elements or rods 26.

Each piece 28 is extended, opposite the face having chamfers, by a butt-end 32 also chamfered, whose thickness is substantially equal to half the space which exist between assemblies 5 and 6 when they are in position.

The anti-blow up device is used as follows, if it is assumed that the assemblies 5 and 6 shown in FIGS. 1 and 2 are inserted in this order (which is in no wise obligatory).

Assembly 6 is brought, by means of an overhead crane, vertically above a location having pins 4. Assembly 6 is then lowered. At the end of lowering, piece 28 comes into abutment with its inner chamfer on the chamfer 23 of the end piece 14 of pin 4. Lowering of the assembly continues, which pushes blade springs 18 back until their pieces 28 snap into the indentation 12 on pins 4.

The assembly 5, not having the cluster of elongated elements 26 is loaded in the same way. The assembly is lowered. The lower chamfer of each end piece 26 comes into abutment against the chamfer 23 of end piece 10 of the corresponding pin 3, spring blade 17 is deformed by bending while lowering of the assembly continues and, finally, the spring blade drives catch 22 into the indentation 9. During this lowering, spring blades 18 of the assembly have no force acting on them: only the butt-end of each spring blade 18 comes into contact with the butt-end 32 of a spring blade 18 on the adjacent assembly 6.

Once all the assemblies which form the core are in position, the clusters of plugs are inserted in assemblies 5. Each plug which projects out of a guide tube 8 passes through a corresponding bore 27 in the end piece 7, then the guide piece 33 into which it is guided by the corresponding chamfer 20. The plug forming element then inserts between pieces 21 and 28, which locks pieces 21 and 28 situated on each side in position, as well as the spring blade 28 on adjacent assembly 6, because of the abutting connection between butt ends 32. Thus it can be seen that, by inserting a cluster of elements 26, not only the assembly which receives the cluster but also the adjacent assemblies are locked.

With the clusters of plug forming elements inserted, the upper core plate is positioned, which prevents any axial movement of the clusters of plug forming elements 26 and, consequently, any movement of elements 26.

Unloading of the assemblies takes place by the reverse process, after removing the upper core plate and clusters of elements. It should be noted that theforce required for freeing the assemblies is hardly greater than their weight, since it is sufficient to overcome the small resilient force of spring blades 17 and 18.

In the embodiment shown in FIGS. 1 and 2, assemblies 5 are placed in position equipped with their clusters of rods. But a spring is then provided for holding the cluster at rest in a position sufficiently high so that the rods do not hinder the free movement of spring blades 17 and 18. For that it is sufficient for the spring to hold the rods at rest at a level higher than that of the guide pieces 33. With all the assemblies in the core, the upper core plate is positioned, which compresses the spring of the clusters and pushes the rods 26 into the guide pieces 33 then between pieces 21 and 28. During unloading of the core, the springs raise the rods 26 above the guide pieces 33 when the core plate is removed.

The embodiment shown in FIGS. 3 and 4 differs essentially from that of FIGS. 1 and 2 in that a single pin 34 carried by the sole-piece and situated below the gap which separates the two adjacent assemblies 5 and 6, participates in holding the two assemblies in position. The two assemblies are this time different. Assembly 5 has resilient members 35 of a single type, comparable in form to that of spring blades 17 and pieces 21 of FIGS. 1 and 2. Each resilient member 35 comprises a spring blade having at its lower end a fork shaped piece with three catches 36, 37 and 38 directed outwardly of assembly 5. During loading of assembly 5 without its cluster of rods 26, when assembly 6 is already in place, catch 36 is engaged in a groove 39 in pin 34, whereas the lateral catches 37 and 38 are engaged in notches 4 formed in the lateral wall of the end piece 7 of the adjacent assembly 6. The catches, grooves and notches have, as in the preceding case, chamfers facilitating insertion and removal. When the cluster of elongated elements 26 is inserted, the elements come into abutment against the face of the resilient member 35 opposite catches 36, 37 and 38, thus preventing the catches from escaping from the groove 39 and notches 40.

In the embodiment shown very incompletely in FIGS. 5, 6 and 7, the same pin 41 again participates in holding the two adjacent assemblies 5 and 6 in position. This pin 41 comprises a thick middle part but having a groove 43 with chamfered edges, and two thin wings 44. Two catches 45, forming part of the spring blades 47 connected to the end piece 7 of assembly 6, come into engagement with thin wings. On the end piece 7 of assembly 5 is fixed a blade spring 50 having at its end a catch 51 occupying the whole width of blade 50, which width is sufficient for the elements 26 to be applied against the blade and for catch 51 to be engaged in grooves 49. This arrangement of spring blades 47 and 50 may be considered as being in cascade. The element 26, when it is inserted, holds the spring blade in a position such that its catch 51 is locked in groove 43 and retains catches 45, which cannot unlock by bending because they are in abutment against wings 44.

Finally, the embodiment shown in FIGS. 8 and 9 may be regarded as being reversed with respect to that shown in FIGS. 1 and 2. The blade springs 55 and 60 are secured to a sole-piece fixed to the core support plate 1 whereas the pins are fast with the end piece 7 of assemblies 5 and 6. Pins 52 are identical in all the assemblies. They comprise a longitudinal chamfered groove 53 turned outwardly of the assembly. Each of the grooves 53 is provided so as to receive a catch 54 forming part of each of the blade springs 55 and 60. Each blade spring 60 also has a guide 61 for receiving two elements 26 and guiding them axially. Each spring 55 carries, opposite its catch 54, a fork shaped piece 56 whose nose pieces 57 and 58 come into contact with the elements 26. These elements, when they are in position as shown in FIGS. 8 and 9, prevent any bending of leaf springs 55 and 60 and ensure reciprocal locking of catches 54 in grooves 53.

The invention is susceptible of numerous further embodiments. In particular, although this solution is generally less favorable, the anti-blow up device may associate elements carried by the upper end piece of the assemblies and by the upper core plate. It should of course be understood that the scope of the present patent extends to such variants, as well more generally as to all others remaining within the scope of equivalences.

Thus the invention is not limited to fuel assemblies comprising guide tubes as structural and guide members, nor to reactor cores using clusters of plugs.

In fact, the invention extends to devices in which the rods 26 are replacable by tubes, made from material transparent to neutrons, held in position by the upper core plate and positioned in grid cells equipped or not with guide tubes 8.

I claim:

1. In a nuclear reactor having a stationary horizontal core plate and a plurality of upright nuclear fuel assemblies all having the same cross-section and located side by side in a regular polygonal network on said core plate, comprising fuel assemblies of a first type, each having at least two locations for elongated elements insertable vertically into said locations and fuel assemblies of the second type each adjacent a fuel assembly of the first type, a device for simultaneously holding down a pair of adjacent fuel assemblies comprising a plurality of locking sets each having at least one deformable locking member carried by each one of said fuel assemblies and a plurality of rigid members carried by said core plate, each of said deformable locking members being so located with respect to one of said locations and with at least one of said rigid members that insertion of an elongated element into an associated one of said locations in the fuel assembly of the first type in said pair forces the deformable locking members of the fuel assemblies of the first and second types of said pair into positive engagement with at least one of the rigid members.

2. A device according to claim 1 wherein the locations for receiving said elongated elements are defined by guide tubes which are part of a framework of the fuel assembly.

3. A device according to claim 1, wherein each said deformable member comprises a blade spring having an end portion securely connected to the respective fuel assembly and having at its other end a chamfered catch cooperating with a chamfered indentation formed in the associated one of said rigid members.

4. A device according to claim 1, wherein each of said deformable members comprises at least one abutting surface arranged for cooperation with the lateral surface of one of said elongated elements.

5. In a nuclear reactor having a stationary horizontal core plate and a plurality of upright nuclear fuel assemblies all having the same cross-section and located side by side in a regular polygonal network on said core plate, all said fuel assemblies being identical and each having at least two locations for elongated elements insertable vertically into said locations and a lower end piece, a device for simultaneously locking on said core plate and holding down at least two adjacent fuel assemblies, comprising: a plurality of rigid members secured to said core plate and projecting upwardly from said core plate; a plurality of downwardly projecting deformable members each formed by a blade spring securely connected to said one lower piece at the upper end thereof and provided at the lower end thereof with catch means arranged for co-operating with the rigid member and with abutting means arranged for slidable abutment against a lateral surface of an associated one of said elongated elements; and bores for slidably receiving elongated elements formed in the lower pieces of said fuel assemblies, disposed, with respect to the deformable members carried by said assembly, so that the elongated element prevents bending of two associated ones of said deformable members, one of which is carried by the fuel assembly into which the elongated element is inserted and the other of which is carried by an adjacent one of said fuel assemblies, and prevents release of the catches of the two last-named deformable members when said elongated element is in inserted posisition in the fuel assembly, wherein said deformable members carried by one of said fuel assemblies comprise a first set of said blade springs arranged for being forced into locking arrangement with an associated one of said rigid members by insertion of an elongated element in the fuel assembly carrying said first set of blade springs, and a second set of blade springs so located that the blade springs of the second set of blade springs in two adjacent assemblies are in sliding abutment against each other and the blade spring of a fuel assembly devoid of elongated elements is forced into engagement with an associated one of said rigid memebers due to said sliding abutment upon insertion of the elongated element in the adjacent fuel assembly.

6. A device according to claim 5, wherein bores for passage of said elongated elements are formed in said lower end piece and disposed with respect to the blade springs so that the elongated elements prevent bending of the blade springs and prevent release of a catch thereof when in inserted position.

7. In a nuclear reactor having nuclear fuel assemblies and a horizontal core plate for supporting said fuel assemblies, each of said fuel assemblies having a lower end part connected to an upper end part by a plurality of guide tubes which define vertical passages, a device for locking on said horizontal core plate and for holding down at least one of said nuclear fuel assemblies, comprising:

at least two elongated members arranged for vertical downward insertion as a whole through said vertical passage into a position where they project out of said lower end plate and for removal thereof, at least two flexible locking members having an end portion thereof securely connected to said lower end part and projecting downwardly from said end piece, and at least two rigid members connected to said core plate and projecting upwardly from said core plate, said locking members and rigid members having cooperating locking means arranged for mutual engagement when said fuel assembly is supported by said core plate and for opposing upward movement of said fuel assembly when engaged and said locking members being so shaped and located with respect to said vertical passages so as to take a sliding abutment against said elongated elements positively latching said locking members and rigid members when said elongated elements are fully inserted.

* * * * *

UNITED STATES PATENT AND TRADEMARK OFFICE
CERTIFICATE OF CORRECTION

PATENT NO. : 4,675,151
DATED : June 23, 1987
INVENTOR(S) : Joseph Leclercq

It is certified that error appears in the above-identified patent and that said Letters Patent is hereby corrected as shown below:

On the title page Item (19) "Leclerco" should read --Leclercq--.

Item (75) Inventor should read -- Joseph Leclercq--.

Signed and Sealed this

Twelfth Day of April, 1988

Attest:

DONALD J. QUIGG

Attesting Officer

Commissioner of Patents and Trademarks